United States Patent
Aliminati

(10) Patent No.: US 9,906,578 B2
(45) Date of Patent: *Feb. 27, 2018

(54) SYSTEM AND METHOD FOR PROVIDING AN ENTERPRISE DEPLOYMENT TOPOLOGY

(71) Applicant: Oracle International Corporation, Redwood Shores, CA (US)

(72) Inventor: Janga Aliminati, Santa Clara, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 644 days.

This patent is subject to a terminal disclaimer.

(21) Appl. No.: 13/679,812

(22) Filed: Nov. 16, 2012

(65) Prior Publication Data

US 2013/0179876 A1 Jul. 11, 2013

Related U.S. Application Data

(60) Provisional application No. 61/585,188, filed on Jan. 10, 2012, provisional application No. 61/620,881, filed on Apr. 5, 2012.

(51) Int. Cl.
*G06F 9/445* (2006.01)
*H04L 29/08* (2006.01)
(Continued)

(52) U.S. Cl.
CPC .......... *H04L 67/02* (2013.01); *H04L 12/4641* (2013.01); *H04L 29/06612* (2013.01);
(Continued)

(58) Field of Classification Search
CPC ..... G06F 8/61; G06F 8/60; G06F 8/65; G06F 8/63; H04L 29/08981
(Continued)

(56) References Cited

U.S. PATENT DOCUMENTS 7,210,143 B2 * 4/2007 Or et al. ............... 717/174
7,240,325 B2 7/2007 Keller
(Continued)

FOREIGN PATENT DOCUMENTS

EP 1577765 9/2005
EP 1565814 11/2007
(Continued)

OTHER PUBLICATIONS

SAS(R) 9.2 Intelligence Platform: Installation and Configuration Guide, http://support.sas.com/documentation/cdl/en/biig/60946/HTML/default/viewer.htm#befdep.htm, retrieved Dec. 26, 2012, 4 pages.
(Continued)

*Primary Examiner* — Li B Zhen
*Assistant Examiner* — Bradford Wheaton
(74) *Attorney, Agent, or Firm* — Tucker Ellis LLP

(57) ABSTRACT

In accordance with an embodiment, one or more enterprise software application products, such as Fusion Applications, can be installed and/or configured according to an integration and deployment design/blueprint that is built or optimized for use within a multi-tiered enterprise deployment topology at an organization/customer's data center. Based on the organization/customer's site topology and needs/requirements, provisioning of the software applications can be optimized, and application life cycle operations performed. This enables each product component to be aware of the topology, which in turn provides customers with an "out-of-the-box" solution. The deployment topology can also be optimized for security, performance and simplicity.

20 Claims, 7 Drawing Sheets

(51) Int. Cl.
*H04L 29/06* (2006.01)
*H04L 12/46* (2006.01)
*H04L 12/24* (2006.01)

(52) U.S. Cl.
CPC ...... *H04L 41/0893* (2013.01); *H04L 63/0209* (2013.01); *H04L 63/0218* (2013.01); *H04L 67/10* (2013.01); *H04L 67/34* (2013.01); *G06F 8/60* (2013.01); *G06F 8/61* (2013.01); *H04L 41/0886* (2013.01)

(58) Field of Classification Search
USPC .......................................................... 717/177
See application file for complete search history.

(56) References Cited

U.S. PATENT DOCUMENTS

| | | | |
|---|---|---|---|
| 7,926,051 | B2 | 4/2011 | Barta et al. |
| 8,290,627 | B2 | 10/2012 | Richards et al. |
| 8,312,127 | B2 | 11/2012 | Nedelcu et al. |
| 2002/0046125 | A1* | 4/2002 | Speicher ............. G06Q 10/087 705/22 |
| 2002/0157020 | A1* | 10/2002 | Royer .......................... 713/201 |
| 2004/0122942 | A1 | 6/2004 | Green et al. |
| 2005/0080801 | A1 | 4/2005 | Kothandaraman et al. |
| 2005/0273849 | A1 | 12/2005 | Araujo et al. |
| 2006/0080413 | A1 | 4/2006 | Oprea et al. |
| 2007/0136788 | A1* | 6/2007 | Monahan et al. ................ 726/3 |
| 2007/0260702 | A1 | 11/2007 | Richardson et al. |
| 2008/0098099 | A1* | 4/2008 | Khasnis et al. ............... 709/222 |
| 2008/0178278 | A1* | 7/2008 | Grinstein ............ H04L 63/0227 726/12 |
| 2008/0256531 | A1 | 10/2008 | Gao et al. |
| 2009/0089368 | A1 | 4/2009 | Fujiwara et al. |
| 2010/0057848 | A1* | 3/2010 | Mangold ............. G06F 19/3481 709/203 |
| 2010/0058331 | A1 | 3/2010 | Berg et al. |
| 2011/0161914 | A1* | 6/2011 | Xie et al. ....................... 717/101 |
| 2011/0289134 | A1* | 11/2011 | de los Reyes et al. ........ 709/203 |
| 2012/0005646 | A1 | 1/2012 | Manglik et al. |
| 2013/0018765 | A1* | 1/2013 | Fork et al. ...................... 705/34 |
| 2013/0179874 | A1* | 7/2013 | Aliminati ...................... 717/176 |
| 2013/0179876 | A1* | 7/2013 | Aliminati ...................... 717/177 |

FOREIGN PATENT DOCUMENTS

| | | |
|---|---|---|
| EP | 1974263 | 10/2008 |
| JP | 2006163694 A | 6/2006 |
| JP | 2007512618 A | 5/2007 |
| JP | 2009087032 A | 4/2009 |
| WO | 2005057325 A | 6/2005 |

OTHER PUBLICATIONS

Deployment Plan, http://msdn.microsoft.com/en-us/library/ff649036.aspx, retrieved Dec. 26, 2012, 6 pages.
Coupaye, T. et al., Foundations of Enterprise Software Deployment, http://equipes-lig.imag.fr/adele/Les.Publications/intConferences/CSMR2000Est.pdf, Oct. 1999, 9 pages.
Automated Provisioning for Applications in the Cloud, VMware vFabric Application Director: Provisioning & Management, http://www.vmware.com/products/application-platform/vfabric-application-director/overview.html, retrieved Dec. 26, 2012, 2 pages.
VMware vFabric Application Director, Provision and Scale High-Performing Applications Faster in the Cloud, A Riverbed and VMware Joint Partner Brief, Aug. 21, 2012, http://www.riverbed.com/vmware/assets/PartnerSolutionBrief-Riverbed_Stingray_vFabric_App_Dir.pdf, 4 pages.
Amazon Virtual Private Cloud FAQs, Amazon Web Services, http://aws.amazon.com/vpc/faqs/, retrieved Dec. 26, 2012, 13 pages.
Securing the Microsoft Platform on Amazon Web Services, Amazon Web Services, Aug. 2012, http://d36cz9buwru1tt.cloudfront.net/AWS_Microsoft_Platform_Security.pdf, 22 pages.
Dell Kace—Software Deployment Tools and Automated Solutions, Enterprise Software Deployment Appliances and Tools—Dell KACE™, http://www.kace.com/solutions/business-needs/systems-deployment, retrieved Dec. 24, 2012, 3 pages.
Pistoia, M. et al., Enterprise Java Security, Building Secure J2EE Applications, 2004, http://flylib.com/books/en/4.289.1.56/1/, retrieved Dec. 26, 2012, 4 pages.
International Searching Authority, International Search Report and Written Opinion for PCT International Patent Application No. PCT/US2013/021048, dated Apr. 8, 2013, 8 pages.
Japanese Patent Office, Office Action dated Aug. 30, 2016 for Japanese Patent Application No. 2014-551428, 4 pages.
Wu, Jin Shuang. "The Research and Optimum Design of the J2EE-Based E-Commerce Platform for Enterprise." Diss. Wuhan U of Technology, 2005, 71 pages.
Office Action issued by State Intellectual Property Office of the People's Republic of China for Chinese patent application No. 201380004322.7, dated Jun. 3, 2016 (16 pages).

* cited by examiner

SYSTEM AND METHOD FOR PROVIDING AN ENTERPRISE DEPLOYMENT TOPOLOGY

CLAIM OF PRIORITY

This application claims the benefit of priority to U.S. Provisional Patent Application titled "SYSTEM AND METHOD FOR PROVIDING AN ENTERPRISE DEPLOYMENT TOPOLOGY", Application No. 61/585,188, filed Jan. 10, 2012; and U.S. Provisional Patent Application titled "SYSTEM AND METHOD FOR PROVIDING AN ENTERPRISE DEPLOYMENT TOPOLOGY", Application No. 61/620,881, filed Apr. 5, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to application servers, and enterprise deployment, and is particularly related to a system and method for providing an enterprise deployment topology, for use with enterprise applications such as Fusion Applications.

BACKGROUND

Traditional methods of enterprise application deployment often require organizations/customers to install software application products within a single node at a data center, or to customize the installation to best suit the particular requirements of the customer site.

With complex enterprise application products, which include many software components, such products have traditionally been deployed to best suit the needs of each individual component, with less consideration as to how the components (in the context of Oracle Fusion Applications, the different applications that comprise a Fusion Applications environment) should be wired together, e.g., how many application server or Weblogic domains should be included, or how the middleware components should be used.

There are generally no well-defined blueprints regarding the deployment of such products. This is the general area that embodiments of the invention are intended to address.

SUMMARY

In accordance with an embodiment, one or more enterprise software application products, such as Fusion Applications, can be installed and/or configured according to an integration and deployment design/blueprint that is built or optimized for use within a multi-tiered enterprise deployment topology at an organization/customer's data center. Based on the organization/customer's site topology and needs/requirements, provisioning of the software applications can be optimized, and application life cycle operations performed. This enables each product component to be aware of the topology, which in turn provides customers with an "out-of-the-box" solution. The deployment topology can also be optimized for security, performance and simplicity.

DETAILED DESCRIPTION

Figure 1:
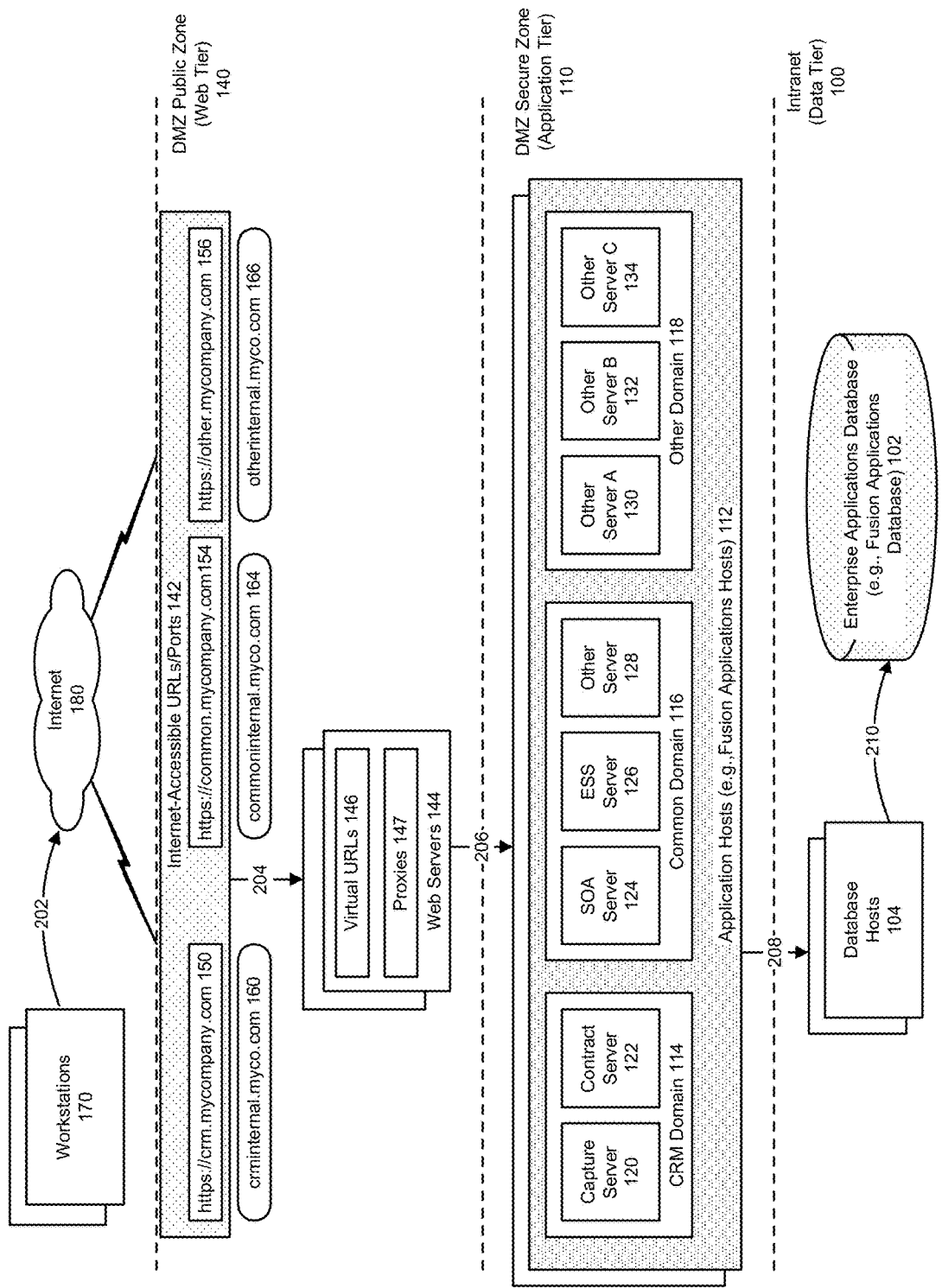
FIG. 1 illustrates a system which includes a multi-tiered enterprise deployment topology, in accordance with an embodiment.

As described above, traditional methods of enterprise application deployment have been generally geared to best suiting the needs of each individual component, with less consideration as to how the components (in the context of Oracle Fusion Applications, the different applications that comprise a Fusion Applications environment) should be wired together.

To address this, in accordance with an embodiment, one or more enterprise software application products, such as Fusion Applications, can be installed and/or configured according to an integration and deployment design/blueprint that is built or optimized for use within a multi-tiered enterprise deployment topology at an organization/customer's data center.

Based on the organization/customer's site topology and needs/requirements, provisioning of the software applications can be optimized, and application life cycle operations performed. This enables each product component to be aware of the topology, which in turn provides customers with an "out-of-the-box" solution. The deployment topology can also be optimized for security, performance and simplicity.

In accordance with an embodiment, an enterprise deployment topology is a design/blueprint or set of guidelines for use in configuring a system, which is based on proven technologies and recommendations, and which spans several product components across a technology stack, e.g., database, middleware, application, and administration or control products.

A typical enterprise deployment topology may include the following characteristics:

The deployment topology should consider business service level agreements, to make high-availability guidelines as widely applicable as possible.

The deployment topology should leverage technologies such as database grid servers, and storage grid with low-cost storage, to provide a highly resilient, lower cost infrastructure.

The deployment topology should use results from performance impact studies for different configurations, to ensure the architecture is optimally configured to perform and scale to business needs.

The deployment topology should enable control over the length of time to recover from an outage, and the amount of acceptable data loss resulting from, e.g., a natural disaster.

The deployment topology should follow software manufacturer guidelines and recommended architectures, which in some instances may be independent of hardware and operating systems.

The above-described characteristics of a typical enterprise deployment topology are provided by way of illustration. In accordance with other embodiments, different characteristics of an enterprise deployment topology can be included.

In accordance with an embodiment, Fusion Applications is a unified suite of business applications designed to unify enterprise processes (e.g., transactional and business processes, business intelligence, and collaborative technologies) within a seamless, standards-based, user experience. A Fusion Applications environment can be adapted to suit customer needs, by adding additional products or components. For example, a Fusion Applications environment may include Oracle WebLogic Server as a Java application server; Oracle WebCenter as a design tool for building enterprise portals and websites; and Oracle Business Intelligence as a means of providing business intelligence capabilities. As an organization/customer's needs change, additional Fusion Applications product components, such as e.g., Hyperion, can be added, to extend the environment's business intelligence capabilities to include enterprise performance management.

The above-described examples of a Fusion Applications environment and product components are provided by way of illustration. In accordance with other embodiments, different types of enterprise application environments and/or product components can be used.

Glossary

In accordance with an embodiment, as referred to herein, the following terms are used. It will be evident that, in accordance with other embodiments, other features may be provided, and that the invention is not limited to the particular terminology and features described hereunder:

Oracle home: An Oracle home contains installed files necessary to host a specific product. For example, the SOA Oracle home contains a directory that contains binary and library files for Oracle SOA Suite. An Oracle home resides within the directory structure of the Middleware home.

WebLogic Server home: A WebLogic Server home contains installed files necessary to host a WebLogic Server. The WebLogic Server home directory is a peer of Oracle home directories and resides within the directory structure of the Middleware home.

Middleware home: A Middleware home consists of the Oracle WebLogic Server home, and, optionally, one or more Oracle homes. A Middleware home can reside on a local file system or on a remote shared disk that is accessible through NFS.

Oracle instance: An Oracle instance contains one or more active middleware system components, e.g., Oracle Web Cache, Oracle HTTP Server, or Oracle Internet Directory. An administrator can determine which components are part of an instance, either at install time or by creating and configuring an instance at a later time.

Domain: The basic administrative unit of Oracle WebLogic Server.

Managed Server: Hosts business applications, application components, Web services, and their associated resources.

Failover: When a member of a high availability system fails unexpectedly (unplanned downtime), in order to continue offering services to its consumers, the system undergoes a failover operation. If the system is an active-passive system, the passive member is activated during the failover operation and consumers are directed to it instead of the failed member. The failover process can be performed manually, or it can be automated by setting up hardware cluster services to detect failures and move cluster resources from the failed node to the standby node. If the system is an active-active system, the failover is performed by the load balancer entity serving requests to the active members. If an active member fails, the load balancer detects the failure and automatically redirects requests for the failed member to the surviving active members.

Failback: After a system undergoes a successful failover operation, the original failed member can be repaired over time and be re-introduced into the system as a standby member. If desired, a failback process can be initiated to activate this member and deactivate the other. This process reverts the system back to its pre-failure configuration.

Hardware cluster: A hardware cluster is a collection of computers that provides a single view of network services (e.g., an IP address) or application services (e.g., databases, Web servers) to clients of these services. Each node in a hardware cluster is a standalone server that runs its own processes. These processes can communicate with one another to form what looks like a single system that cooperatively provides applications, system resources, and data to users.

Cluster agent: The software that runs on a node member of a hardware cluster that coordinates availability and performance operations with other nodes.

Clusterware: Software that manages the operations of the members of a cluster as a system. It allows one to define a set of resources and services to monitor via a heartbeat mechanism between cluster members and to move these resources and services to a different member in the cluster as efficiently and transparently as possible.

Shared storage: Shared storage is the storage subsystem that is accessible by all the computers in the enterprise deployment domain.

Primary node: The node that is actively running a Fusion Applications instance at any given time and has been configured to have a backup/secondary node. If the primary node fails, a Fusion Applications instance is failed over to the secondary node.

Secondary node: The node that is the backup node for a Fusion Applications instance. This is where the active instance fails over when the primary node is no longer available.

Network host name: Network host name is a name assigned to an IP address either through the /etc/hosts file or through DNS resolution.

Physical host name: This guide differentiates between the terms physical host name and network host name. This guide uses physical host name to refer to the "internal name" of the current computer.

Physical IP: Physical IP refers to the IP address of a computer on the network. In most cases, it is normally associated with the physical host name of the computer.

Switchover: During normal operation, active members of a system may require maintenance or upgrading. A switchover process can be initiated to allow a substitute member to take over the workload performed by the member that requires maintenance or upgrading, which undergoes planned downtime.

Switchback: When a switchover operation is performed, a member of the system is deactivated for maintenance or upgrading. When the maintenance or upgrading is completed, the system can undergo a switchback operation to activate the upgraded member and bring the system back to the pre-switchover configuration.

Virtual host name: A virtual host name is a network addressable host name that maps to one or more physical computers via a load balancer or a hardware cluster. For load balancers, the name "virtual server name" is used herein interchangeably with virtual host name. A load balancer can hold a virtual host name on behalf of a set of servers, and clients communicate indirectly with the computers using the virtual host name. A virtual host name in a hardware cluster is a network host name assigned to a cluster virtual IP. Because the cluster virtual IP is not permanently attached to any particular node of a cluster, the virtual host name is not permanently attached to any particular node either.

Virtual IP: (Cluster virtual IP, load balancer virtual IP) Generally, a virtual IP can be assigned to a hardware cluster or load balancer. To present a single system view of a cluster to network clients, a virtual IP serves as an entry point IP address to the group of servers which are members of the cluster. A virtual IP can be assigned to a server load balancer or a hardware cluster. A hardware cluster uses a cluster virtual IP to present to the outside world the entry point into the cluster (it can also be set up on a standalone computer). The hardware cluster's software manages the movement of this IP address between the two physical nodes of the cluster while clients connect to this IP address without the need to know which physical node this IP address is currently active on. In a typical two-node hardware cluster configuration, each computer has its own physical IP address and physical host name, while there could be several cluster IP addresses. These cluster IP addresses float or migrate between the two nodes. The node with current ownership of a cluster IP address is active for that address. A load balancer also uses a virtual IP as the entry point to a set of servers. These servers tend to be active at the same time. This virtual IP address is not assigned to any individual server but to the load balancer which acts as a proxy between servers and their clients.

Enterprise Deployment Topology

In accordance with an embodiment, each enterprise deployment topology provides specific application deployment characteristics within an enterprise environment, such as availability, scalability and security.

For example, users at workstations can access, via a load balancer and firewall, a data center, such as an Oracle Data Center, which includes applications, such as Fusion Applications and other enterprise applications that are provided according to a selected deployment topology. Depending on the particular needs/requirements of the customer and/or the application itself, some applications may need to be exposed to the Internet, while others may need to be exposed only within the Intranet, and the selected deployment topology should take this into account. This allows particular applications to be deployed into an environment that use an Intranet internally for enterprise use, and also allows external users to access other applications using the Internet, all while maintaining security between the different applications.

In accordance with an embodiment, the applications at a data center can communicate with one another within the data center, using the hypertext transfer protocol (HTTP) and internal uniform resource locators (URLs), to process requests from the users. Since the internal URLs and their communications are provided within a demilitarized/secure zone (DMZ) of the data center, they can be secured without a need for, e.g., secure socket layer (SSL), which in turn provides performance benefits. The applications can also be accessed by users via virtual hosts and external URLs, which can utilize SSL. Depending on the particular needs/requirements of the customer and/or the application itself, different portions or aspects of the functionality can be made available to Intranet-based users, and/or to Internet-based users. Those URLs that are used only within the data center need not be exposed or accessible outside of the data center to those Intranet or Internet-based customers. During provisioning, if a particular application must have an externally-accessible address, then, in addition to its internal address/URL, an administrator can be prompted to provide a URL for the external address.

FIG. 1 illustrates a system which includes a multi-tiered enterprise deployment topology, in accordance with an embodiment.

As shown in FIG. 1, in accordance with an embodiment, a data center can logically include a plurality of tiers, including an Intranet-accessible data tier 100, a DMZ-secured application (app) tier 110, and a DMZ-secured public zone or web tier 140.

In accordance with an embodiment, the data tier can include one or more application databases (e.g., a Fusion Applications database) 102, which are accessible via one or more database hosts 104.

In accordance with an embodiment, the application tier can include one or more application hosts or nodes (e.g., Fusion Applications hosts) 112, each of which in turn include one or more domains and servers. For example, as shown in FIG. 1, an application host may include a customer relationship management (CRM) domain 114, a common domain 116, and various other domains 118; each of which respectively may include a capture server 120, contract server 122, SOA server 124, ESS server 126, or other servers 128, 130, 132, 134.

In accordance with an embodiment, the DMZ-secured public zone or web tier can include one or more web servers 144, configured with virtual URL's 146 and proxies 147. In accordance with an embodiment, the web tier is selectively accessible to Internet-based workstations 170, via the Internet 180 and optionally a load balancer, through a plurality of Internet-accessible URLs or ports 142 (e.g., https://crm.mycompany.com 150, https://common.mycompany.com 154, and https://other.mycompany.com 156); and to internal services, located within the data center, through a plurality of internally-accessible URL's (e.g., crminternal.mycompany.com (crminternal.myco.com) 160, commoninternal.mycompany.com (commoninternal.myco.com) 164, and otherinternal.mycompany.com (otherinternal.myco.com) 166). As described above, depending on the particular needs/requirements of the customer and/or the application itself, those URLs used within the data center need not be exposed or accessible outside of the data center to those Intranet or Internet-based customers. In accordance with an embodiment, internal URL's serve two purposes: for any internal access within the data center/intranet; and for application to application communication. For example, when the user request goes to an application, that application internally may need to talk to a few other applications to get the required data. This application to application communication is routed through the above internal URL's.

Depending on the configuration ultimately deployed, external workstations can access applications at the data center by communicating requests 202 via the Internet, and the Internet-accessible URLs/ports, which then communicates those requests via the web servers configured with virtual URL's and proxies 204, to the application hosts 206, and if necessary the data tier and/or application database 208, 210.

In accordance with an embodiment, administrative client applications (Thick clients) deployed in the Fusion applications (hosted on-demand or customer on-premise) environments can require direct access from end users (functional administrators) to application servers or file systems via HTTP or socket connections. These thick clients can be connecting from either within the intranet (for the on-premise deployment) or from VPN (for on-demand deployment).

In accordance with an embodiment, the main issue is that a number of end users need to access from the thick-clients that are installed on window servers. Since these thick clients need direct access (socket connection) to internal data center environment, installation of thick clients on desktop/servers of the end users are not preferable. It is also not preferable to open direct access across the firewalls, since generally data center deployment and security best practice do not allow this type of configuration.

In accordance with an embodiment, windows servers with the administrative thick clients can be hosted within a data center with secured HTTP remote desk top connection (RDC) enabled. To host the window servers within the data center, a separate administrative subnet can be created. The end user can access to the thick clients over VPN, and only the thick clients (from the administrative subnet) can access to application servers/file systems in the data center.

In accordance with an embodiment, based on the above use case, at any time there should not be any direct communication path from a end user from a customer location to any application/file system within the data center, either there can be a secured RDC over HTTP connection or socket connection for the end users to these thick clients. Some client components are only integrated with socket connection, hence enforcing VPN access for those components is required.

The arrangement illustrated in FIG. 1 is provided by way of illustration. In accordance with other embodiments, different types and arrangements of domains and servers may be provided within the various tiers.

Determination of Enterprise Deployment Topology

Based on the organization/customer's site topology and their needs/requirements, a particular enterprise deployment topology can be determined. For example, a customer may wish to implement supply chain management (SCM) within their organization, so the enterprise deployment topology must accommodate an SCM component (e.g., Fusion Applications SCM).

Figure 2:
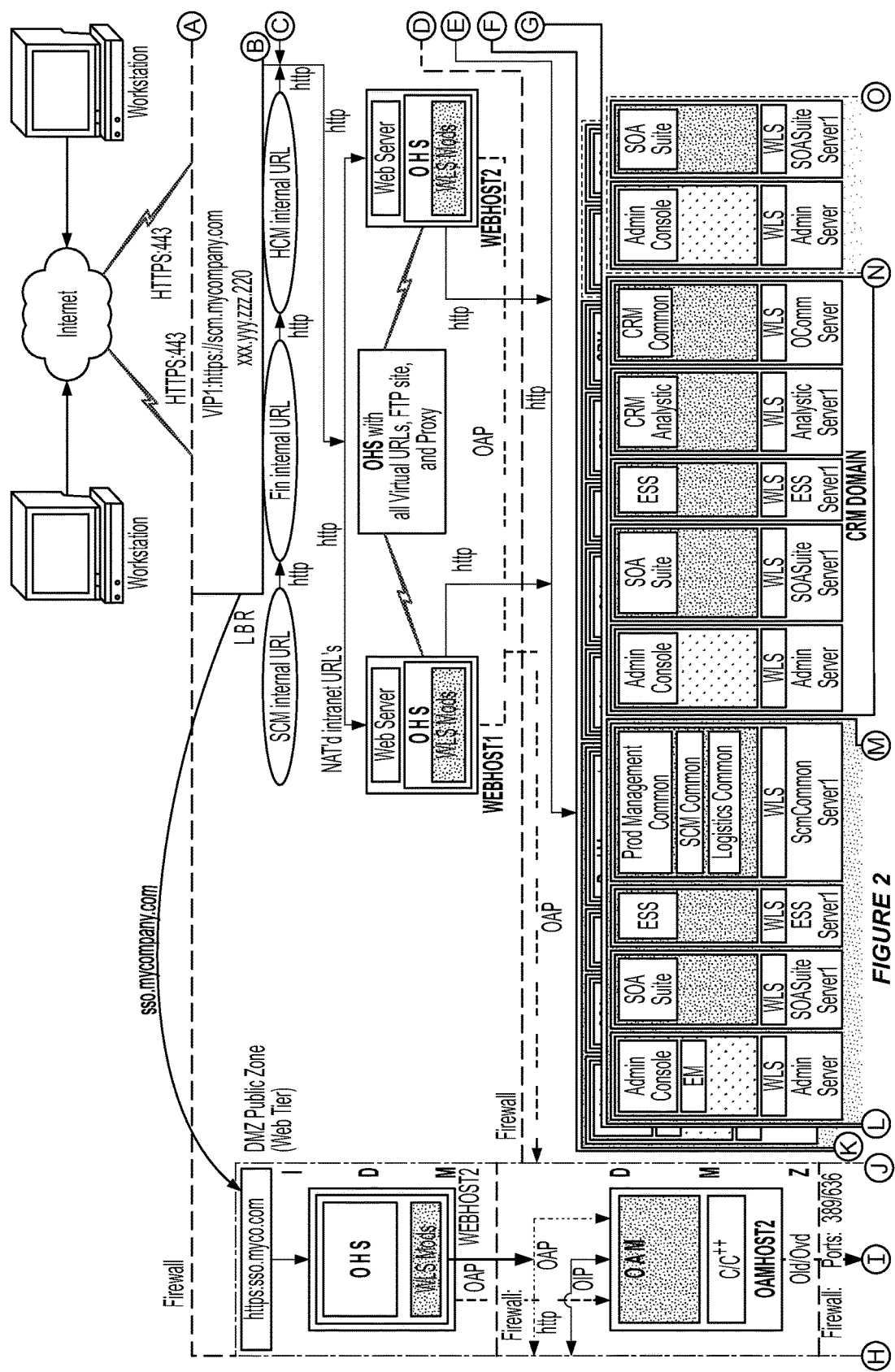
FIG. 2 illustrates an example of an enterprise deployment topology, in accordance with an embodiment.
Figure 2:
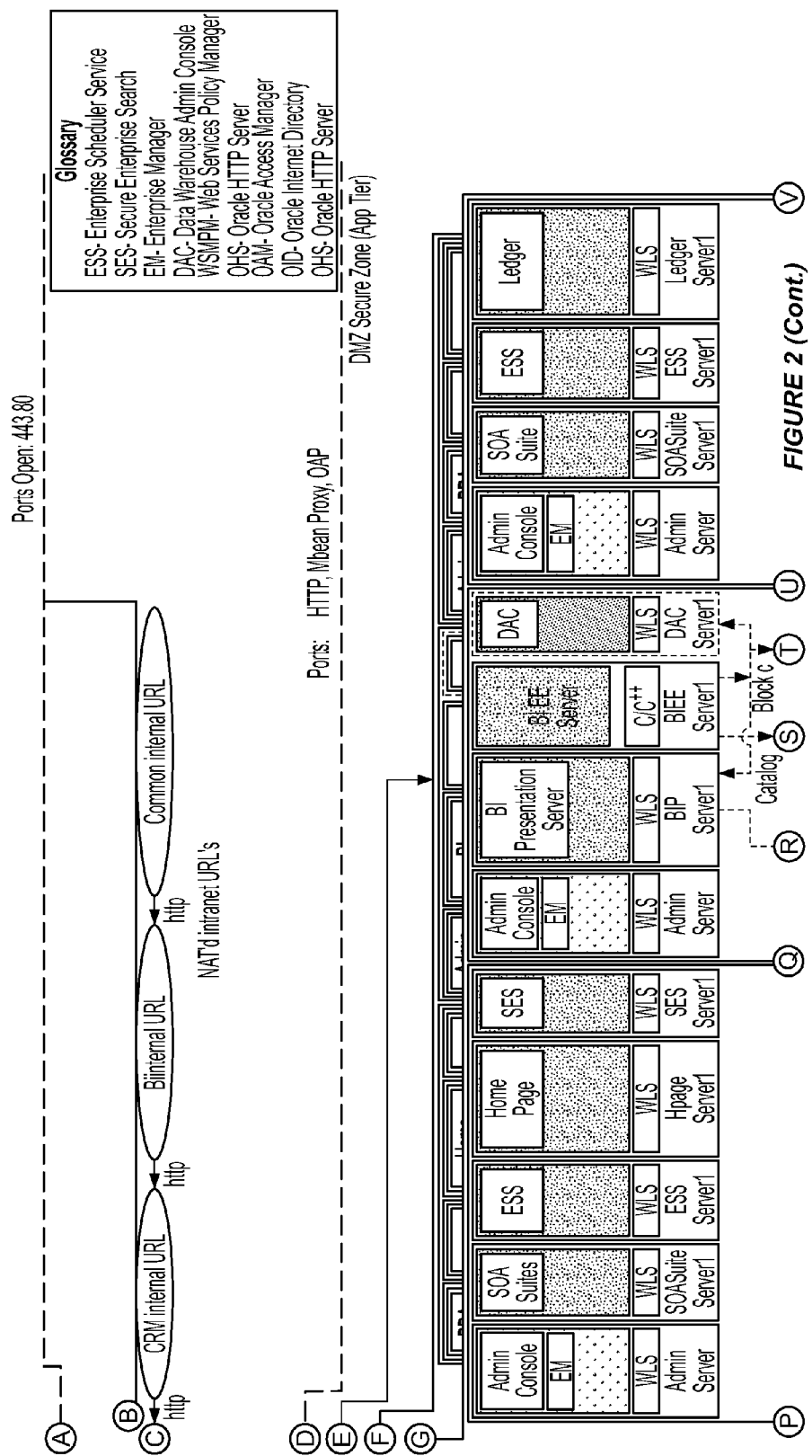
Figure 2:
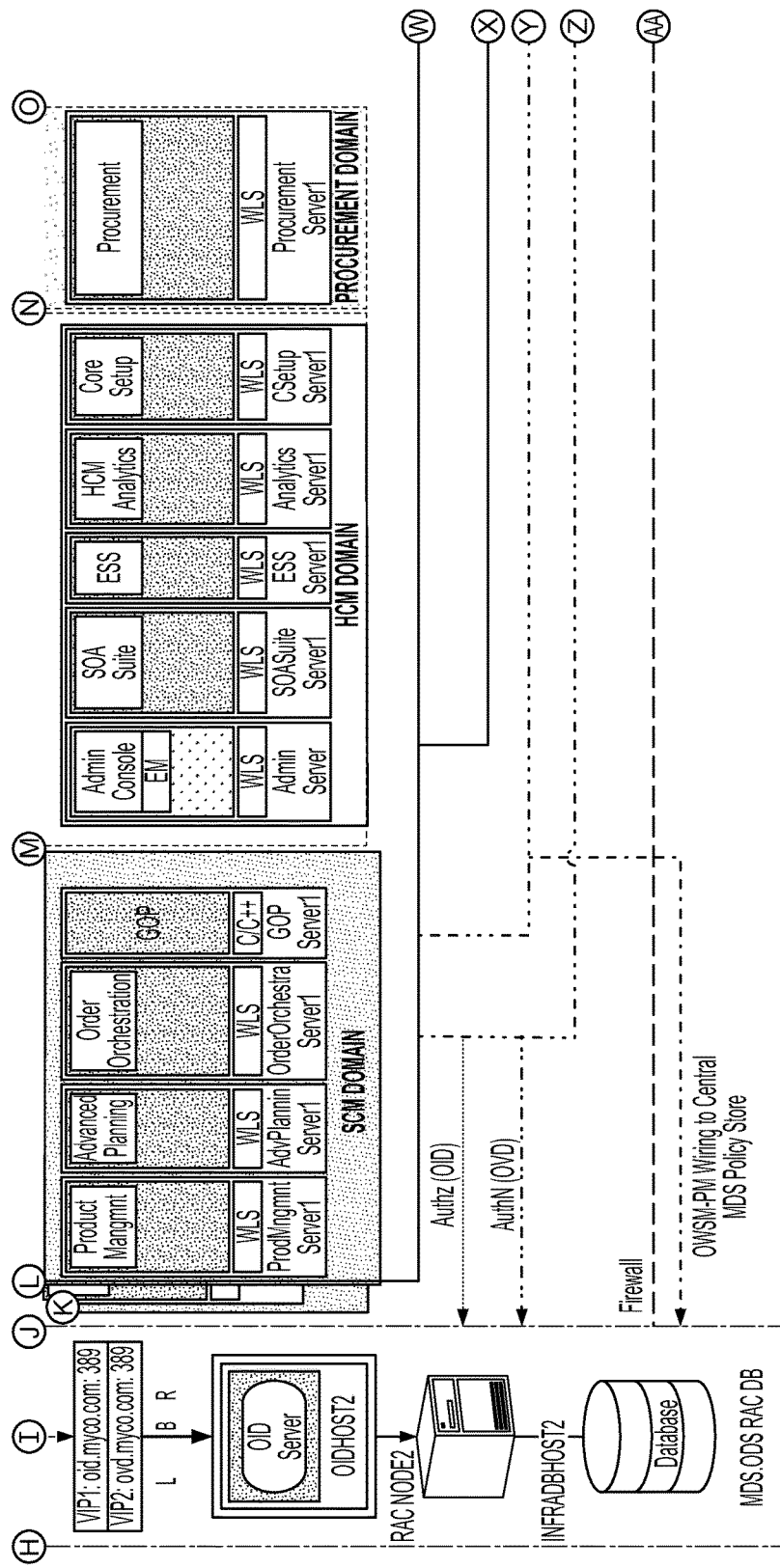
Figure 2:
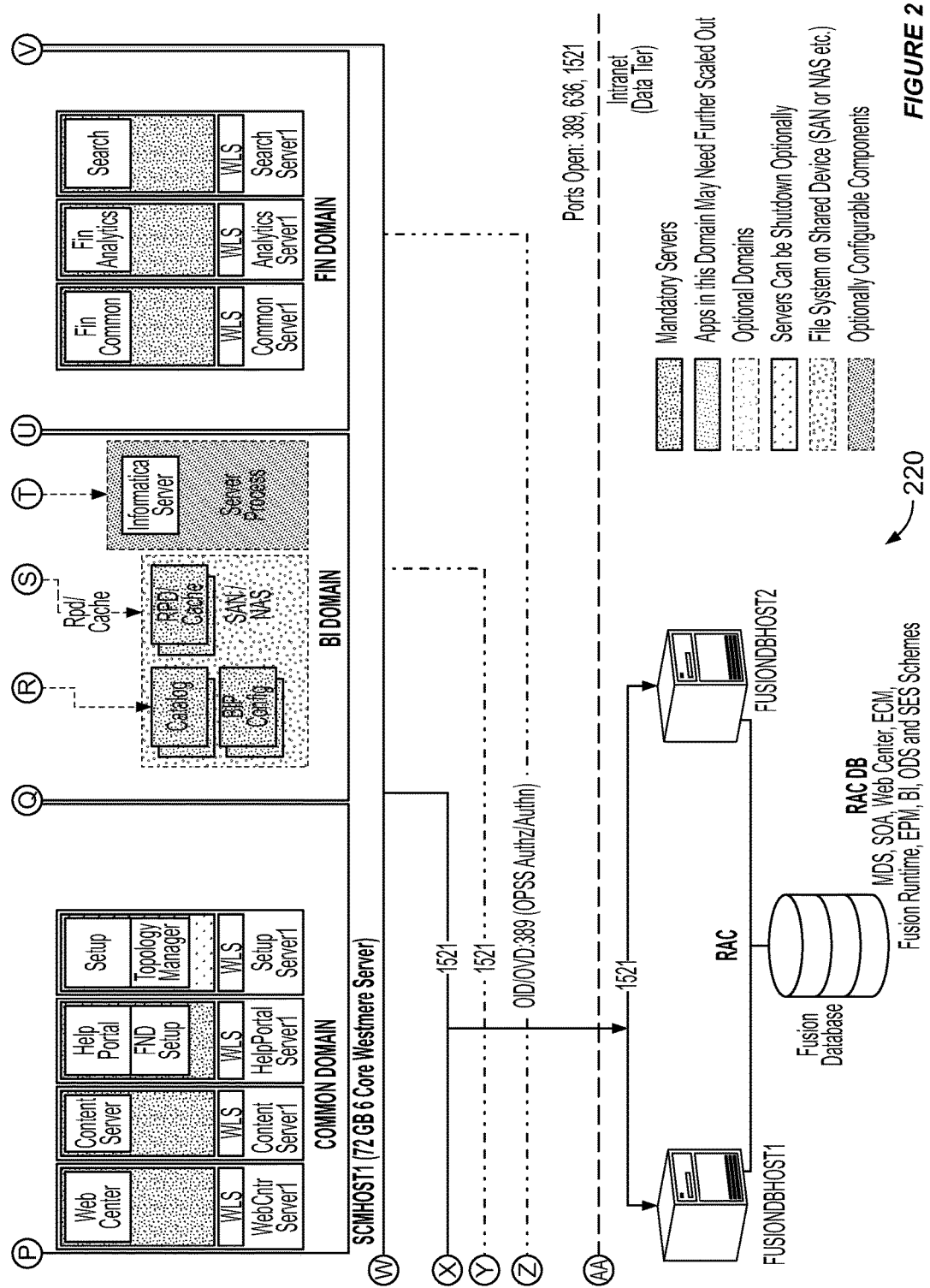

FIG. 2 illustrates an example of an enterprise deployment topology 220, in accordance with an embodiment.

In the example shown in FIG. 2, in accordance with an embodiment, a primary node SCMHOST1 is actively running a Fusion Applications instance that includes an SCM component. A secondary node (SCMHOST2) acts as the redundant or highly available node for that Fusion Applications instance. In accordance with an embodiment, the primary node includes an administration server and applications that have been deployed to managed servers. Managed servers can be grouped together in clusters to provide scalability and high availability for applications. Together, the primary and secondary nodes form a domain.

As further shown in FIG. 2, in accordance with an embodiment, nodes in the web tier are located in a demilitarized zone (DMZ) public zone. In the example illustrated, two nodes WEBHOST1 and WEBHOST2 run Oracle HTTP Server, which can be configured with WebGate to allow requests to be proxied from Oracle HTTP Server to WebLogic Server, and optionally perform operations such as user authentication.

In accordance with an embodiment, the web tier includes a load balancer router to handle external requests. External requests are sent to the virtual host names configured on the load balancer. The load balancer then forwards the requests to Oracle HTTP Server. On the firewall protecting the Oracle Web Tier, only the HTTP ports are open: 443 for HTTPS, and 80 for HTTP.

In accordance with an embodiment, when an external load balancer is used, it should preferably include features such as load-balancing traffic to a pool of real servers through a virtual host name, so that clients access services using the virtual host name instead of actual host names; port translation so that incoming requests on the virtual host name and port are directed to a different port on the back-end servers; monitoring of ports on the servers in the pool to determine availability of a service; configuring of virtual server names and ports; detection of node failures; maintaining of sticky connections to components, such as cookie-based persistence or IP-based persistence; and ability to terminate SSL requests at the load balancer and forward traffic to back-end real servers using the equivalent non-SSL protocol (e.g., HTTP rather than HTTPS).

As further shown in FIG. 2, in accordance with an embodiment, nodes in the application tier are located in a DMZ secure zone. In the example shown in FIG. 2, SCMHOST1 and SCMHOST2 run the managed servers in the Oracle Supply Chain Management domains, and also run servers such as the WebLogic Server Administration Console and the Oracle Enterprise Manager Fusion Middleware Control.

In the example shown in FIG. 2, in accordance with an embodiment, on the firewall protecting the application tier, the HTTP ports, OAP port, and proxy port are open. The OAP port allows a WebGate module running in Oracle HTTP Server in the Oracle Web Tier to communicate with Oracle Access Manager. Applications requiring external HTTP access can use Oracle HTTP Server as the proxy.

As further shown in FIG. 2, in accordance with an embodiment, in the data tier, located in the most secured network zone, a database (e.g., an Oracle RAC database) runs on nodes FUSIONDBHOST1 and FUSIONDBHOST2. In accordance with an embodiment, the database contains the schemas needed by the Oracle Fusion Applications components, and the components running in the application tier access this database. On the firewall protecting the data tier, the database listener port (typically 1521) is required to be open. The LDAP ports (typically 389 and 636) are also required to be open for the traffic accessing the LDAP storage in the IDM enterprise deployment.

In accordance with an embodiment, the applications at the data center can communicate with one another, within the data center, using HTTP and internal URLs, to process requests from the users. Since these internal URLs and their communications are provided within a DMZ secure zone of the data center, they can be secured without a need for SSL, which provides performance benefits. The applications can also be accessed by users via virtual hosts and external URLs, which can utilize SSL. Different portions or aspects of the functionality can be made available to Intranet-based users, and/or to Internet-based users, depending on the particular requirements of each application, and the particular needs of the enterprise. Those URLs used within the data center are not exposed or accessible outside of the data center to those Intranet or Internet-based customers.

The enterprise deployment topology illustrated in FIG. 2 is provided by way of illustration. In accordance with other embodiments, and depending on different customer sites, needs and requirements, different enterprise deployment topologies can be provided.

Implementing the determined Enterprise Deployment Topology

In accordance with an embodiment, the following approach can be used to implement a determined enterprise deployment topology:

- Prepare the network for an enterprise deployment, including creating any externally accessible load balancer virtual IPs on the load balancer (e.g., crmexternal.mycompany.com; scmexternal.mycompany.com). These virtual server names act as the access point for all HTTP traffic to the runtime components. The HTTP traffic from client browser to the load balancer is always in SSL. The virtual IPs receive requests externally (from the intranet or internet) on port 443 in SSL mode. These requests are forwarded to one of the HTTP server's "external virtual hosts specific to each domain" on WEBHOST1 or WEBHOST2. Some deployment topologies also require separate secure network address translations internal virtual IPs for each domain, (e.g., crminternal.mycompany.com; scminternal.mycompany.com). The above virtual URLs (virtual IPs) are defined on the load balancer and are used for internal invocations of services within the data center, but are not exposed to the internet or intranet, and are only accessible within the data center. The virtual IPs receive all the requests internally on port 7777 in non-SSL mode. All the internal services/clients access these virtual IPs using the above virtual addresses, and the requests are then forwarded to one of Oracle HTTP Server's "internal virtual hosts specific to each domain" on WEBHOST1 or WEBHOST2. For additional Oracle WebLogic Server security, the internal virtual IPs s listed above can be configured with a load-balancing router rule that accepts requests only from known hosts like CRMHOST1, CRMHOST2, or from the system administrator host, and rejects all other requests.
- Prepare the database for an enterprise deployment, including providing information such as the connection information, database type, host name including where applicable a virtual IPs name, listen port number for the database service name of the database (crm.mycompany.com), and the username, password and role of a user with administrative privileges.
- Use the provisioning wizard to create a provisioning plan and/or install components for an enterprise deployment. Provisioning is the set of operations required to install, configure, and deploy applications product offerings from a system point of view, including operations related to laying down the components needed to create an enterprise application (e.g., Fusion Applications) environment, tailoring of components based on the applications topology, creating of managed server instances and cluster members, updating of endpoints and virtual hosts, and starting of managed servers and clusters.
- Scale out the deployment topology, including where appropriate enterprise application product components such as HTTP server, node manager, customer relationship management domain, and supply chain management domain.
- Configure the administration server for high availability, including enabling the administration server and the applications deployed to it for failover, such as deploying the administration server on a disk shared between the primary node and the secondary node.
- Configure server migration for an enterprise deployment, including configure server migration for managed servers such that they can be migrated to other nodes should a failure occur.
- Configure additional components such as business intelligence applications.
- Install any release update patches.
- Manage the topology, including monitoring, scaling, and backing up the topology.

As described above, one of the steps in implementing the selected enterprise deployment topology is to use a provisioning wizard to create a provisioning plan and/or install components for an enterprise deployment.

Figure 3:
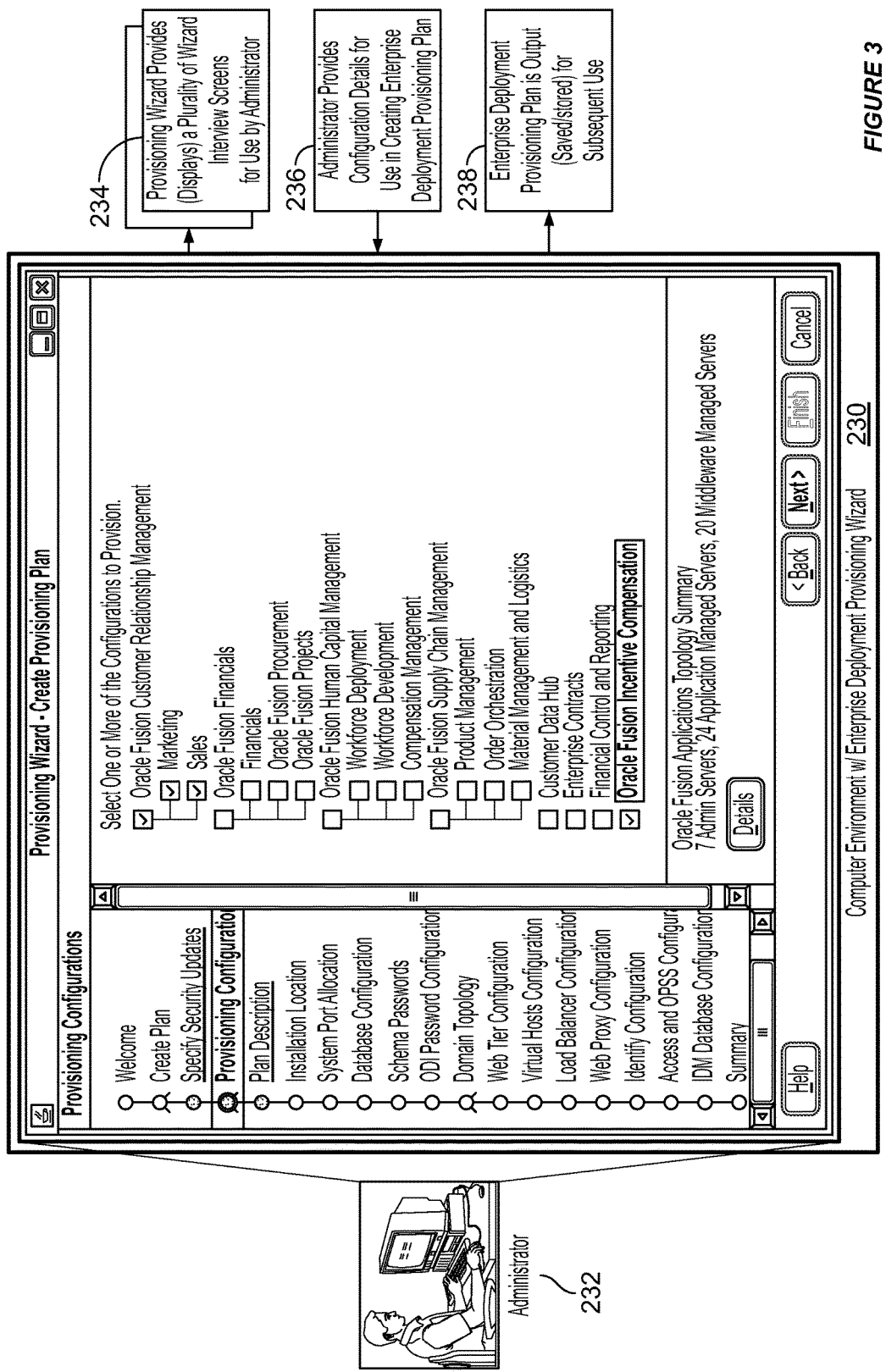
FIG. 3 illustrates an example of a user interface for use in deploying an enterprise deployment topology, in accordance with an embodiment.

FIG. 3 illustrates an example of a user interface for use in deploying an enterprise deployment topology, in accordance with an embodiment.

As shown in FIG. 3, in accordance with an embodiment, a computer environment with an enterprise deployment provisioning wizard or other suitably configured executable software program 230 is provided, which guides an administrator 232 through installing components for use within an enterprise deployment. The administrator can generate the provisioning plan by accessing a plurality of wizard interview screens 234, and providing requested configuration details 236, for use by the wizard in creating the provisioning plan 238. The plan can then be stored for subsequent use by provisioning installers when they run the physical installation. Information that the wizard collects include descriptive information for the plan, database connection details, product family domains to be created, allocated system ports, virtual hosts, etc.

Figure 4:
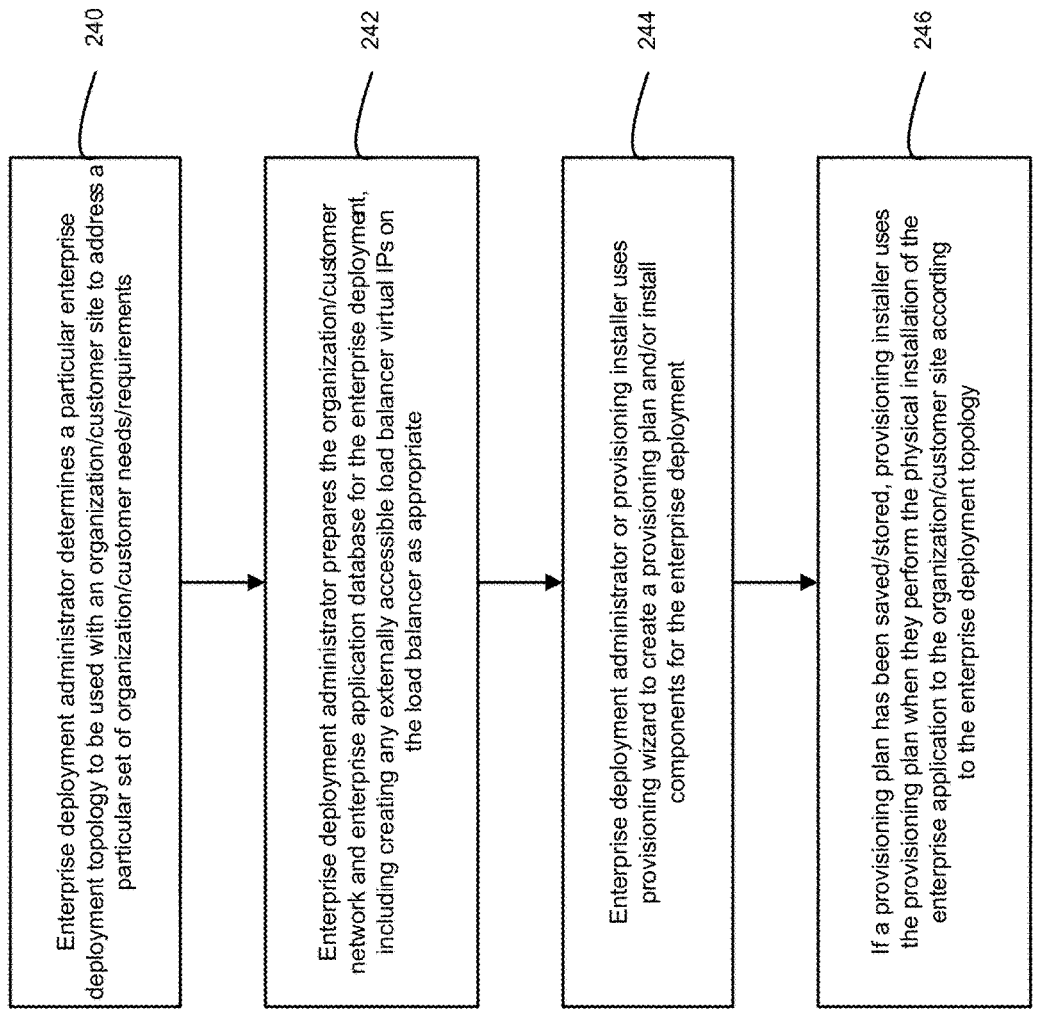
FIG. 4 illustrates a method of installing and/or configuring a system which includes a multi-tiered enterprise deployment topology, in accordance with an embodiment.

FIG. 4 illustrates a method of installing and/or configuring a system which includes a multi-tiered enterprise deployment topology, in accordance with an embodiment. As shown in FIG. 4, at step 240, an enterprise deployment administrator determines a particular enterprise deployment topology to be used with an organization/customer site to address a particular set of organization/customer needs/requirements.

At step 242, the enterprise deployment administrator prepares the organization/customer network and enterprise application database for the enterprise deployment, including creating any externally accessible load balancer virtual IPs on the load balancer, as appropriate.

At step 244, the enterprise deployment administrator, or a provisioning installer uses the provisioning wizard to create a provisioning plan and/or install components for the enterprise deployment.

At step 246, if a provisioning plan has been saved/stored, the provisioning installer uses the provisioning plan when they perform the physical installation of the enterprise application to the organization/customer site according to the enterprise deployment topology.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing an enterprise deployment topology, comprising:
    a data center having a plurality of computer nodes, including one or more processors, on which a plurality of enterprise applications are executed for use within an organization;
    wherein the data center operates as a plurality of tiers, including an Intranet-accessible data tier, a secured application tier, and a secured public zone that includes a plurality of web servers, wherein the web servers provided in the secured public zone are configured with virtual addresses, so that the web servers are accessible to clients external to the data center via virtual hosts and external URLs, and are accessible to enterprise application components located within the data center via internal URLs;
    wherein the plurality of enterprise applications executing at the data center within the secured application tier communicate with one another enterprise application within the data center using HTTP without secure socket layer (SSL) via the internal URLs, and are accessed by the clients external to the data center via the virtual hosts and external URLs provided by the web servers, to process requests from the clients;
    wherein the plurality of enterprise applications are provisioned and deployed to the computer nodes of the data center according to an enterprise deployment topology, a provisioning plan, and requirements of the enterprise applications;
    an administrative subnet in the data center, wherein the administrative subnet includes a plurality of thick client applications hosted therein;
    a VPN socket connection which is independent of the external URLs provided by the web servers, and which allows SSL access to the administrative subnet from a workstation external to the data center;
    wherein the VPN socket connection enables the workstation to communicate with the plurality of thick client applications hosted in the administrative subnet, such that the thick client applications can communicate requests from the workstation to the plurality of application enterprise applications executing on the plurality of computer nodes.

2. The system of claim 1, further comprising a computer environment with an enterprise deployment provisioning wizard or other suitably configured executable software program, which guides an administrator through determining the enterprise deployment topology and installing components for use within an enterprise deployment.

3. The system of claim 2, wherein the provisioning wizard displays a plurality of wizard interview screens, which received configuration details from the administrator, for use by the wizard in creating a provisioning plan, wherein the provisioning plan can then be stored for subsequent use by provisioning installers when they perform a physical installation of the enterprise applications at the data center.

4. The system of claim 1, wherein the enterprise applications are Fusion Applications.

5. A method of providing an enterprise deployment topology, comprising the steps of:
    providing, at a data center, a plurality of computer nodes, including one or more processors, on which a plurality of enterprise applications are executed for use within an organization;
    wherein the data center operates as a plurality of tiers, including an Intranet-accessible data tier, a secured application tier, and a secured public zone that includes a plurality of web servers, wherein the web servers provided in the secured public zone are configured with virtual addresses, so that the web servers are accessible to clients external to the data center via virtual hosts and external URLs, and are accessible to enterprise application components located within the data center via internal URLs;
    wherein the plurality of enterprise applications executing at the data center within the secured application tier communicate with one another enterprise application within the data center using HTTP without secure socket layer (SSL) via the internal URLs, and are accessed by the clients external to the data center via the virtual hosts and external URLs provided by the web servers, to process requests from the clients;
    wherein the plurality of enterprise applications are provisioned and deployed to the computer nodes of the data center according to an enterprise deployment topology, a provisioning plan, and requirements of the enterprise applications;
    providing an administrative subnet in the data center, wherein the administrative subnet includes a plurality of thick client applications hosted therein;
    providing a VPN socket connection which is independent of the external URLs provided by the web servers, and which allows SSL access to the administrative subnet from a workstation external to the data center; and
    wherein the VPN socket connection enables the workstation to communicate with the plurality of thick client applications hosted in the administrative subnet, such that the thick client applications can communicate requests from the workstation to the plurality of application enterprise applications executing on the plurality of computer nodes.

6. The method of claim 5, further comprising providing an enterprise deployment provisioning wizard or other suitably configured executable software program, which guides an administrator through determining the enterprise deployment topology and installing components for use within an enterprise deployment.

7. The method of claim 6, wherein the provisioning wizard displays a plurality of wizard interview screens, which received configuration details from the administrator, for use by the wizard in creating a provisioning plan, wherein the provisioning plan can then be stored for subsequent use by provisioning installers when they perform a physical installation of the enterprise applications at the data center.

8. The method of claim 5, wherein the enterprise applications are Fusion Applications.

9. A non-transitory computer readable storage medium, including instructions stored thereon which when read and executed by one or more computers cause the one or more computers to perform the steps comprising:
   providing, at a data center, a plurality of computer nodes, including one or more processors, on which a plurality of enterprise applications are executed for use within an organization;
   wherein the data center operates as a plurality of tiers, including an Intranet-accessible data tier, a secured application tier, and a secured public zone that includes a plurality of web servers, wherein the web servers provided in the secured public zone are configured with virtual addresses, so that the web servers are accessible to clients external to the data center via virtual hosts and external URLs, and are accessible to enterprise application components located within the data center via internal URLs;
   wherein the plurality of enterprise applications executing at the data center within the secured application tier communicate with one another enterprise application within the data center using HTTP without secure socket layer (SSL) via the internal URLs, and are accessed by the clients external to the data center via the virtual hosts and external URLs provided by the web servers, to process requests from the clients;
   wherein the plurality of enterprise applications are provisioned and deployed to the computer nodes of the data center according to an enterprise deployment topology, a provisioning plan, and requirements of the enterprise applications;
   providing an administrative subnet in the data center, wherein the administrative subnet includes a plurality of thick client applications hosted therein;
   providing a VPN socket connection which is independent of the external URLs provided by the web servers, and which allows SSL access to the administrative subnet from a workstation external to the data center; and
   wherein the VPN socket connection enables the workstation to communicate with the plurality of thick client applications hosted in the administrative subnet, such that the thick client applications can communicate requests from the workstation to the plurality of application enterprise applications executing on the plurality of computer nodes.

10. The non-transitory computer readable storage medium of claim 9, further comprising providing an enterprise deployment provisioning wizard or other suitably configured executable software program, which guides an administrator through determining the enterprise deployment topology and installing components for use within an enterprise deployment.

11. The non-transitory computer readable storage medium of claim 10, wherein the provisioning wizard displays a plurality of wizard interview screens, which received configuration details from the administrator, for use by the wizard in creating a provisioning plan, wherein the provisioning plan can then be stored for subsequent use by provisioning installers when they perform a physical installation of the enterprise applications at the data center.

12. The non-transitory computer readable storage medium of claim 9, wherein the enterprise applications are Fusion Applications.

13. The system of claim 1, wherein the system further comprises a user interface that:
   guides an administrator through interview screens via which configuration details are received from the administrator, and
   outputs the provisioning plan for subsequent use in installing the enterprise applications at the data center.

14. The method of claim 5, further comprising providing a user interface that:
   guides an administrator through interview screens via which configuration details are received from the administrator, and
   outputs the provisioning plan for subsequent use in installing the enterprise applications at the data center.

15. The non-transitory computer readable storage medium of claim 9, further including instructions which when read and executed by the one or more computers cause the one or more computers to perform the steps comprising providing a user interface that:
   guides an administrator through interview screens via which configuration details are received from the administrator, and
   outputs the provisioning plan for subsequent use in installing the enterprise applications at the data center.

16. The system of claim 1, wherein, during provisioning of a particular enterprise application, the particular enterprise application is associated with both an externally-accessible address, and an internal address.

17. The system of claim 1, wherein the clients external to the data center access the data center via the virtual hosts and external URLs, using a secure socket layer (SSL); and wherein the plurality of enterprise applications executing at the data center within the secured application tier communicate with one another enterprise application within the data center using the internal URLs servers and a non-SSL mode.

18. The method of claim 5, wherein, during provisioning of a particular enterprise application, the particular enterprise application is associated with both an externally-accessible address, and an internal address.

19. The method of claim 5, wherein the clients external to the data center access the data center via the virtual hosts and external URLs, using a secure socket layer (SSL); and wherein the plurality of enterprise applications executing at the data center within the secured application tier communicate with one another enterprise application within the data center using the internal URLs servers and a non-SSL mode.

20. The non-transitory computer readable storage medium of claim 9, wherein, during provisioning of a particular enterprise application, the particular enterprise application is associated with both an externally-accessible address, and an internal address.

* * * * *